United States Patent Office 3,776,935
Patented Dec. 4, 1973

3,776,935
PROCESS FOR THE PRODUCTION OF POLYISOCYANATES
James D. McClure and George W. Conklin, Oakland, Calif., assignors to Shell Oil Company, New York, N.Y.
No Drawing. Filed Aug. 26, 1971, Ser. No. 175,334
Int. Cl. C07c 119/04
U.S. Cl. 260—453 PC                                    10 Claims

ABSTRACT OF THE DISCLOSURE

An improved process for preparing carbocyclic aromatic isocyanates comprises contacting a carbocyclic aromatic polynitro compound with carbon monoxide in the presence of a catalyst system consisting of certain noble metal halides, heteroaromatic nitrogen compounds and an iron borate.

BACKGROUND OF THE INVENTION

It is known that aromatic isocyanates can be prepared from aromatic nitro compounds by a two-step process which comprises (1) reducing the nitro compound to the corresponding amine and (2) contacting the amine with phosgene. See, for example, W. Siefram, Liebigs Annalen der Chemie, volume 563 (1949) at page 96 and Germassmer, U.S. Pat. No. 3,188,337. It would be of advantage, however, to prepare aromatic polyisocyanates in a one-step process directly from aromatic polynitro compounds without prior or separate reduction to the corresponding polyamine. It would also be of advantage to prepare such aromatic polyisocyanates in a process which does not require the highly corrosive and toxic phosgene.

In order to provide such a simplified technique, it has been proposed to react an organic nitro compound with carbon monoxide in the presence of various metal catalysts. For example, British Pat. No. 1,025,436 describes a process for preparing isocyanates from the corresponding nitro compounds by reacting the organic nitro compound with carbon monoxide in the presence of a noble metal or compound thereof. However, this process results in the production of no more than trace amounts of organic polyisocyanate when an aromatic polynitro compound such as dinitrotoluene is reacted with carbon monoxide using as a catalyst a noble metal compound such as rhodium trichloride, palladium dichloride, iridium trichloride or osmium trichloride.

Other related techniques utilize noble metal-based catalyst systems wheren additional components are added as promoters. For example, U.S. Pat. No. 3,46,149 describes the use of a catalyst system consisting of a noble metal or noble metal compound and a Lewis acid in the reaction of an organic nitro compound with carbon monoxide. However, the yield of aromatic diisocyanates from the corresponding aromatic dinitro compounds afforded by this process is still economically unattractive.

Other catalyst systems reported disclose the use of noble metal compounds with non-noble metal compounds (U.S. Pat. No. 3,523,966), with organophosphorus compounds (U.S. Pat. No. 3,523,962) and with acid halides used as promoters (U.S. Pat. 3,523,965). These catalyst systems exhibit little or no selectivity for the production of diisocyanates from the corresponding dinitro compounds.

Other noble metal-based catalyst systems have been disclosed which additionally contain a heteroaromatic nitrogen compound (U.S. Pat. No. 3,576,835), a Group V–B or VI–B metal oxide together with an inorganic copper compound (U.S. Pat. 3,523,963) or discrete particles of iron oxide (published Netherlands application No. 6913250). However, utilization of the catalyst systems to produce isocyanates from a polynitro compound such as dinitrotoluene results in only moderate selectivity to a diisocyanate product when high total selectivity to isocyanate products is obtained. Moreover, such catalyst systems exhibt a marked decrease in selectivity to total isocyanate products at higher conversion levels.

It would be an advantage to utilize a catalyst which would afford a high selectivty to the polyisocyanate product at high levels of conversion of reactants in a one-step process wherein the polyisocyanate is produced directly from the corresponding polynitro compound. The term "polyisocyanate" as used herein refers to an organic compounds with a plurality of isocyanate groups and does not refer to a polymeric material involving the isocyanate group.

SUMMARY OF THE INVENTION

It has now been found that carbocyclic aromatic polyisocyanates can be prepared in an improved process by contacting a carbocyclic aromatic polynitro compound with carbon monoxide at elevated temperature and pressure in the presence of a catalyst system consisting of certain noble metal halides wherein the noble metal is palladium or rhodium, a heteroaromatic nitrogen base and an iron boroate.

Noble metal halides such as palladium dichloride and rhodium trichloride, while individually inactive as catalysts for the conversion of aromatic nitro compounds to isocyanates, have been complexed with heteroaromatic nitrogen bases such as pyridine and isoquinoline to produce an improved catalyst system. However, the activity of such catalyst systems is moderate and the selectivity for polyisocyanate products is low. The addition of an iron borate to such a catalyst system results in high conversions of the polynitro compound and a very high selectivity to isocyanate products.

DESCRIPTION OF THE PREFERRED EMBODIMENTS

The improved process of the invention is conducted by contacting an aromatic carbocyclic polynitro compound with carbon monoxide at elevated temperature and pressure in the presence of a catalyst system as herein described to convert at least one but preferably all of the nitro groups to isocyanate groups. It appears likely that the reaction proceeds according to the following equation wherein dinitrotoluene has been selected as exemplary of polynitro compounds which may be used in practicing the process of this invention.

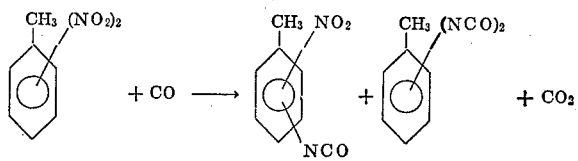

From the above equation it can be seen that more than one mole of carbon monoxide is required for the conversion of each mole of nitro group to the desired isocyanate product, and in practice the reaction is conducted in the presence of carbon monoxide equivalent to or in excess of that required for the reaction. In general, molar ratios of carbon monoxide to aromatic reactant vary from about 3:1 to about 100:1.

Aromatic nitro compound.—The process of the invention is generally applicable to aromatic polynitro compounds in which each nitro group is attached to an aromatic carbon atom, i.e., a carbon atom which is a member of a six-membered carbocyclic aromatic ring. The aromatic polynitro compound is monocyclic or polycyclic of up to four fused or separate aromatic rings, preferably of from one to two aromatic rings, has from 6 to 30 carbon atoms, preferably from 6 to 15 carbon atoms, and has from two to four nitro groups, preferably from two to three nitro groups, which comprise the only nitro groups present within the molecule. The aromatic polynitro compounds are carbocyclic aromatic polynitro compounds containing only carbon and hydrogen other than the nitrogen and oxygen atoms of the nitro groups or are substituted carbocyclic aromatic polynitro compounds additionally containing non-interfering substituents such as halogens of atomic number 9 to 53 inclusive, i.e., fluorine, chlorine, bromine, and iodine or atoms of oxygen and sulfur incorporated in non-interfering functional groups such as alkoxy, aryloxy, alkaryloxy, carbalkoxy, alkylthio and arylthio.

One class of such suitable aromatic compounds is represented by the Formula I

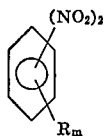

wherein $m$ is a whole number from 0 to 3 inclusive and represents the number of R groups attached to the aromatic ring and R independently is nitro; hydrocarbyl of up to 10 carbon atoms; halogen of atomic number from 9 to 53 inclusive, preferably of atomic number from 17 to 35 inclusive, e.g., chlorine and bromine, alkoxy of up to 6 carbon atoms, e.g., methoxy, ethoxy and the like; aryloxy or alkaryloxy of up to 10 carbon atoms, such as benzyloxy, tolyloxy and the like; alkylthio of up to 6 carbon atoms such as methylthio and ethylthio; or arylthio of up to 10 carbon atoms such as phenylthio and p-methylphenylthio. Hydrocarbyl R groups are preferably free from aliphatic unsaturation and include alkyl such as methyl, ethyl, propyl, pentyl and hexyl, cycloalkyl such as cyclopentyl and cyclohexyl; arylalkyl such as benzyl and phenylethyl; and aryl and alkaryl such as phenyl; tolyl and xylyl. The R groups of Formula I may all be the same or may be in part or wholly different.

Exemplary aromatic polynitro compounds of Formula I are 1,2-dinitrobenzene,
1,3-dinitrobenzene,
1,4-dinitrobenzene,
1,2,4-trinitrobenzene,
1,3,5-trinitrobenzene,
2,4-dinitrotoluene,
2,6-dinitrotoluene,
1-ethyl-3,5-dinitrobenzene,
1-propyl-2,4-dinitrobenzene,
1,2-dimethyl-3,5-dinitrobenzene,
1-cycloheptyl-2,4-dinitrobenzene,
1-phenyl-3,5-dinitrobenzene,
1-phenylthio-2,4-dinitrobenzene,
1-bromo-3-phenyl-2,4-dinitrobenzene,
1-methoxy-2,4-dinitrobenzene,
1-phenoxy-2,4-dinitrobenzene,
1-benzyloxy-3,5-dinitrobenzene,
1-methoxy-3-methyl-2,4-dinitro-5-chlorobenzene,
1-phenylthio-2,4-dinitrobenzene,
1-chloro-2-methoxy-4-methylthio-3,5-dintrobenzene and
1-phenoxy-3-chloro-2,4-dinitrobenzene and
1-ethylthio-2,4-dinitrobenzene.

Other suitable aromatic polynitro compounds include polycyclic aromatic polynitro compounds such as bicyclic naphthyl polynitro compounds, e.g., 1,3-dinitronaphthalene, 1-chloro-2,4-dinitronaphthalene, 1,5-dinitronaphthalene, 1,8-dinitronaphthalene, 1,3,5 - trinitronaphthalene and 1,3,6,8-tetranitronaphthalene and tricyclic polynitro compounds, e.g., dinitroanthracene and 2,7-dinitrophenanthrene.

Aromatic polynitro compounds of Formula I having two to three nitro groups and having R groups selected from nitro, halogen and alkyl are preferably employed in the process of the invention.

The catalyst.—The chemical transformations during the course of the reaction which involve the catalyst are quite complex and no one single structure adequately describes the actual catalyst species. Although it is not desired to be bound by any particular theory, it appears that the actual catalyst species is the noble metal halide complexed or admixed with a heteroaromatic nitrogen compound and promoted by an iron borate co-catalyst.

Noble metal halides which can be utilized in the process of the invention include palladium dichloride, palladium dibromide, palladium diiodide rhodium trichloride, rhodium tribromide and rhodium trichloride, rhodium tribromide, and rhodium triiodide. Heteroaromatic nitrogen compounds which can be complexed or admixed with the noble metal halide and are useful within the process of this invention are those containing only nitrogen and carbon in a 5 or 6 member ring. The heteroaromatic nitrogen compounds are further characterized as containing one or two nitrogen atoms in a ring having at least two double bonds. Such compounds include pyrrole, imidazole, pyrazole, indole, pyridine, pyrazine, and pyridazine. Also effective are polycyclic analogues of the above compounds such as quinoline, isoquinoline, acridine phenanthridine, purine and pyrimidine and substituted derivatives of these compounds and their polycyclic analogues such as 1-methylpyrrole, 3-chloropyridine, 2-aminopyridine, 2,4,6-trimethylpyridine and 8-hydroxyquinoline. Particularly effective are pyridine and isoquinoline and substituted derivatives of pyridine and isoquinoline.

The iron borates which are useful co-catalysts of the invention are those wherein iron is found in a complex boron-matrix in varying ratios of boron to iron. Illustrative of the iron borates are ferric orthoborate, ferrous triborate, ferric metaborate and ferrous hexaborate. These iron borates are typically prepared by precipitation at controled pH from a solution of a soluble borate, e.g., boric acid, by the addition of a solution of an iron compound of the desired oxidation state. Such methods of preparation are well known in the art.

The amount of catalyst system used in the process of the invention is not critical. The ratio of moles of nitro group to mole of noble metal halide can be selected to obtain the desired conversion level or selectivities at a given residence time in the reaction zone. Molar ratios of nitro groups/noble metal halide of up to 132:1 have proven satisfactory in batch operations with a reaction period of four hours; however, ratios between 33:1 and 66:1 are preferred.

The quantity of heteroaromatic nitrogen compound required is that amount which theoretically will complex with the noble metal halide. For example, each mole of palladium dichloride will theoretically complex with two moles of the heteroaromatic nitrogen compound, whereas each mole of rhodium trichloride will theoretically complex with three moles of the heteroaromatic nitrogen compound. However, in practice, amounts ranging from about one-half to about 2 times the amount theoretically required have been used with satisfactory results.

The amount of iron borate to be incorporated into the catalyst system is not critical. However, at a borate to noble metal ratio below about 1:10 the catalytic activity becomes somewhat impaired. In general, the catalysts perform satisfactorily when the borate to noble metal ratio is from about 1:4 to about 4:1.

The reaction conditions—The process of the invention is conducted by any of a variety of procedures. In one modification, the aromatic nitro compound, catalyst and carbon monoxide are charged to an autoclave or similar pressure reactor for operations in a batchwise manner. In another modification, reaction is effected in a continuous operation as by contacting the entire reaction mixture during passage through a tubular reactor. It is equivalently useful to add the carbon monoxide continuously throughout the period of the reaction.

The carbon monoxide is of normal commercial quality and may also contain carbon dioxide and other diluents which are inert in the reaction environment. These diluents should not be of such quantities as to require excessively large process equipment. Carbon monoxide additionally containing carbon dioxide in a $CO/CO_2$ molar ratio up to 6:1 is also satisfactory.

In any modification, the reaction is conducted at elevated temperature and pressure. Suitable reaction temperatures vary from about 100° C. to about 300° C., with best results being obtained at temperatures from about 150° C. to about 250° C. Of course, the reaction temperature selected will be below the decomposition temperature of any of the reactants and the desired product.

The reaction pressure will vary from about 500 p.s.i.g. to about 5000 p.s.i.g. When the process of the invention is conducted in a batchwise manner, the initial carbon monoxide pressure described will decrease with time as some of the carbon monoxide is consumed in the reaction. The total reactor pressure will be maintained so that a substantial portion of the reaction components are in the liquid phase.

The process of the invention operates effectively in the absence of a solvent, but improved overall yields of the organic polyisocyanate are obtained when a solvent which is chemically inert in the reaction environment is employed. Suitable solvents include liquid aromatic hydrocarbons such as benzene, toluene and xylene and aryl halides such as mono- and dichlorobenzene. The proportion of solvent used is not critical and any proportion may be utilized which will not require excessively large equipment to contain. Generally, the amount of polynitro compound in any solvent is in the range of from about 10 to about 50 weight percent.

It is important that the solvent, as well as the other materials charged into the reactor, be substantially anhydrous, since in the presence of water, isocyanates are converted to urea derivatives.

Subsequent to reaction, the reaction mixture is separated by conventional means such as distillation, selective extraction and the like. The polyisocyanate product can be further purified, as for example, by distillation. Those compounds separated from the reaction product wherein less than all of the nitro groups are converted to isocyanate groups, can be recycled along with the recovered solvent and further reacted by the process of this invention to convert the remaining nitro groups to isocyanato groups.

Organic polyisocyanates produced by the process of this invention are suitable for use in preparing polyurethane compositions such as foams, coatings, fibers and the like by reacting the polyisocyanate with a suitable polyether polyol in the presence of a catalyst and, if desired, a foaming agent.

The following illustrative embodiments are presented to describe the invention more fully without any intention of being limited thereby. All parts and percentages are by weight unless otherwise specified.

ILLUSTRATIVE EMBODIMENT I

Preparation of the iron borate co-catalysts

Ferric orthoborate, $FeBO_3$.—A solution of 13.5 g. (33 millimoles, 33 mmole) of $Fe(NO_3)_3 \cdot 9H_2O$ in 100 ml. of water was added slowly to a vigorously stirred solution of 24.8 g. (400 mmoles) of boric acid and 6.0 g. of 28% $NH_4OH$ in 330 ml. of water. The precipitate which first formed redissolved on complete addition of the $Fe(NO_3)_3$. The resulting solution was divided into two portions and 5% $NH_4OH$ was added dropwise to one portion until the onset of precipitation. Then, enough of the second portion was added to the first to redissolve the precipitate. This procedure was repeated until all of the second portion was used. The final solution was just clear and had a pH of 3.

A flocculent precipitate slowly formed over a period of 13 days and was collected by filtration and washed with 50 ml. of 3% boric acid solution. After drying at 70° C. the solid was pulverized with a mortar and pestle and calcined for 2 hours at 300° C. The calcined solid was then analyzed for iron with the following results: Found, 47%, calculated for $FeBO_3$, 48.5%.

Ferrous triborate, $Fe_2B_6O_{11}$.—The following operations were carried out in a nitrogen atmosphere and deaerated water was used. A solution of 10 g. (50 millimoles, 50 mmoles) of $FeCl_2 \cdot 4H_2O$ in 50 ml. of water was slowly added to a vigorously stirred solution of 12.4 g. (200 mmoles) of boric acid and 13 g. of 28% $NH_4OH$ in 50 ml. of water. The pH upon completion of the addition of the $FeCl_2 \cdot 4H_2O$ was about 7 and a pale green precipitate had separated. After standing overnight the solid was collected by filtration and washed with 100 ml. of water. After drying at 90–115° C. overnight, the solid was calcined under nitrogen at 300° C. for 4 hours. About 7 g. (80% yield) of $Fe_2B_6O_{11}$ was obtained. The calcined solid was analyzed for iron with the following results: Found, Fe, 32.5%; calculated for $Fe_2B_6O_{11}$, 31.5%.

ILLUSTRATIVE EMBODIMENT II (A) Into an 80 ml. Inconel autoclave were charged 6 grams, 33 mmole (millimole) of 2,4-dinitrotoluene, 20 g. of dichlorobenzene, 2 mmoles of palladium dichloride, 3.8 mmoles pyridine and 0.5 g. of the ferric orthoborate, $FeBO_3$, prepared according to the procedure of Illustrative Embodiment I. To the autoclave was added 15.0 g. of carbon monoxide which resulted in a reactor pressure of 2400 p.s.i.g. The contents of the autoclave were then heated to a temperature of 200° C. and maintained at this temperature for 4 hours, during which time the pressure decreased from about 3500 p.s.i.g. to about 3200 p.s.i.g.

At the end of this four hour reaction period, the autoclave and its contents were cooled and the pressure vented. The contents were discharged and weighed and the autoclave was rinsed with dichlorobenzene. Insoluble matter present (catalyst plus solids formed during the reaction) was filtered from the reaction mixture and washed with dichlorobenzene. The wash solution was combined with the filtrate and the resulting solution was analyzed by gas-liquid chromatography techniques for 2,4-dinitrotoluene, 2,4-toluene diisocyanate (TDI) and the two toluene monoisocyanate (TMI) isomers (2-isocyanato-4-nitrotoluene and 4-isocyanato-2-nitrotoluene).

The analysis revealed that 95 percent of the 2,4-dinitrotoluene was converted into products and that the selectivity to TDI was 40 percent. Selectivity is defined as the ratio of moles of desired product formed to moles of reactant converted, expressed as a percentage.

(B) Also tested as a co-catalyst under the same conditions as in Illustrative Embodiment II–A were other iron borates, and for comparative purposes tests were run wherein discrete particles of iron oxide were used as a co-catalyst. The procedures used were as described above and the results are shown in Table I.

TABLE I

| Catalyst system | Conversion weight, percent | Selectivity, percent | | |
|---|---|---|---|---|
| | | TDI | TMI | Total |
| $PdCl_2$, 2 mmoles | Inactive | | | |
| $PdCl_2$, 2 mmoles; $Fe_2O_3$, 0.3 g | 25 | Trace | 41 | 41 |
| $PdCl_2$, 2 mmoles; $FeBO_3$, 0.5 g | 35 | 8 | 89 | 97 |
| $PdCl_2$, 2 mmoles; $Fe_2O_3$, 0.3 g.; pyridine, 3.8 mmoles | 88 | 22 | 72 | 94 |
| $PdCl_2$, 2 mmoles; $FeBO_3$, 0.5 g.; pyridine, 3.8 mmoles | 95 | 40 | 59 | 99 |
| $PdCl_2$, 2 mmoles; $Fe_2B_6O_{11}$, 0.15 g.; pyridine, 1.8 mmoles | 93 | 25 | 70 | 95 |
| $PdCl_2$, 2 mmoles; $Fe_2O_3$, 0.15 g.; pyridine, 3.8 mmoles | 75 | 16 | 77 | 93 |
| $PdCl_2$ (2 mmoles); $Fe(BO_2)_3$, 0.15 g.; pyridine, 3.8 mmoles | 93 | 32 | 63 | 95 |

ILLUSTRATIVE EMBODIMENT III

The procedure of Illustrative Embodiment II-A is repeated except that the catalyst system consists of palladium dichloride, isoquinoline and ferric orthoborate. A good yield of 2,4-toluene diisocyanate is obtained.

ILLUSTRATIVE EMBODIMENT IV

The procedure of Illustrative Embodiment II-A is repeated except that the organic nitro compound is bis(4-nitrophenyl)methane. Methylene bis(4-phenyl isocyanate) is produced in good yield.

ILLUSTRATIVE EMBODIMENT V

The procedure of Illustrative Embodiment II-A is repeated except that the organic nitro compound is 1,3,5-trinitronaphthalene. A good yield of 1,3,5-naphthalene triisocyanate is obtained.

ILLUSTRATIVE EMBODIMENT VI

The procedure of Illustrative Embodiment II-A is repeated except that the catalyst system consists of a palladium dibromide-pyridine complex ($[C_5H_5N]_4PdBr_2$) and ferric orthoborate. A good yield of 2,4-toluene diisocyanate is obtained.

ILLUSTRATIVE EMBODIMENT VII

The procedure of Illustrative Embodiment II-A is repeated except that the catalyst system consists of rhodium trichloride, pyridine and ferric orthoborate. A good yield of 2,4-toluene diisocyanate is obtained.

ILLUSTRATIVE EMBODIMENT VIII

The procedure of Illustrative Embodiment II-A is repeated except that the organic nitro compound is a mixture of 2-isocyanato-4-nitrotoluene, 4-isocyanato-2-nitrotoluene and 2,4-dinitrotoluene. A good yield of 2,4-toluene diisocyanate is obtained.

ILLUSTRATIVE EMBODIMENT IX

The procedure of Illustrative Embodiment II-A is repeated except that the organic nitro compound is 1-propyl-2,4-dinitrobenzene. A good yield of 1-propyl-2,4-diisocyanatobenzene is obtained.

ILLUSTRATIVE EMBODIMENT X

The procedure of Illustrative Embodiment II-A is repeated except that the organic polynitro compound is 1-chloro-2,4-dinitronaphthalene. A good yield of 1-chloro-2,4-naphthalene diisocyanate is obtained.

ILLUSTRATIVE EMBODIMENT XI

The procedure of Illustrative Embodiment II-A is repeated except that the organic polynitro compound is 2,7-dinitrophenanthrene. A good yield of 2,7-phenanthrene diisocyanate is obtained.

ILLUSTRATIVE EMBODIMENT XII

The procedure of Illustrative Embodiment II-A is repeated using 1-methylpyrrole in place of the isoquinoline. A good yield of 2,4-toluene diisocyanate is obtained.

ILLUSTRATIVE EMBODIMENT XIII

The procedure of Illustrative Embodiment II-A is repeated using acridine in place of the isoquinoline. A good yield of 2,4-toluene diisocyanate is obtained.

ILLUSTRATIVE EMBODIMENT XIV

The procedure of Illustrative Embodiment II-A is repeated using pyrazine in place of isoquinoline. A good yield of 2,4-toluene diisocyanate is obtained.

We claim as our invention:

1. In the process for preparing carbocyclic aromatic polyisocyanates by contacting carbocyclic aromatic polynitro compounds with carbon monoxide wherein the molar ratio of carbon monoxide to aromatic nitro group is from about 3:1 to about 100:1 at a temperature of from about 100° C. to about 300° C. and at a carbon monoxide pressure of from about 500 p.s.i.g. to about 5000 p.s.i.g. in the pressure of a catalyst system consisting essentially of a noble metal halide and a heteroaromatic nitrogen compound, the improvement which comprises adding to said catalyst system an iron borate, said borate containing only boron and oxygen in addition to said iron, and in an amount such that the borate to noble metal ratio is from about 1:4 to about 4:1.

2. The process of claim 1 wherein the noble metal halide is palladium dichloride, rhodium trichloride, palladium dibromide, rhodium tribromide, palladium diiodide or rhodium triiodide.

3. The process of claim 2 wherein the heteroaromatic nitrogen compound is selected from the group consisting of heteroaromatic nitrogen compounds having a ring containing
   (a) 5 or 6 members in any aromatic ring,
   (b) only nitrogen and carbon in any aromatic ring,
   (c) no more than two nitrogen atoms in any aromatic ring, and
   (d) at least two double bonds in each aromatic ring.

4. The process of claim 3 wherein the heteroaromatic nitrogen compound is pyridine or isoquinoline.

5. The process of claim 4 wherein the iron borate is ferric orthoborate.

6. The process of claim 4 wherein the iron borate is ferrous triborate.

7. The process of claim 1 wherein the aromatic polynitro compound has at least two nitro groups and is represented by the formula

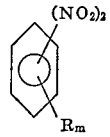

wherein $m$ is a whole number from 0 to 3 inclusive and R independently is nitro, alkyl, cycloalkyl, aralkyl, aryl or alkaryl of up to 10 carbon atoms, chlorine, bromine, alkoxy of up to 6 carbon atoms, aryloxy or alkaryloxy of up to 10 carbon atoms, aralkoxy of up to 10 carbon atoms, alkylthio of up to 6 carbon atoms or arylthio of up to 10 carbon atoms.

8. The process of claim 7 wherein the R groups of the aromatic polynitro compound are selected from chlorine, bromine, alkyl, cycloalkyl, aralkyl, aryl and alkaryl.

9. The process of claim 8 wherein the aromatic polynitro compound is dinitrotoluene.

10. The process of claim 1 wherein the aromatic polynitro compound is bis(4-nitrophenyl)methane.

References Cited
UNITED STATES PATENTS

| | | | |
|---|---|---|---|
| 3,632,827 | 1/1972 | Smith | 260—453 |
| 3,576,835 | 4/1971 | Smith et al. | 260—453 |

LEWIS GOTTS, Primary Examiner

D. H. TORRENCE, Assistant Examiner

U.S. Cl. X.R.

252—429 C

PO-1050
(5/69)

UNITED STATES PATENT OFFICE
CERTIFICATE OF CORRECTION

Patent No. 3,776,935                     Dated  December 4, 1973

Inventor(s) JAMES D. MCCLURE ET AL

It is certified that error appears in the above-identified patent and that said Letters Patent are hereby corrected as shown below:

Col. 1, line 51 of the patent, please make the following change:

U.S. Patent No. 3,46,149 should read -

"U.S. Patent No. 3,461,149"

Signed and sealed this 16th day of April 1974.

(SEAL)
Attest:

EDWARD M. FLETCHER, JR.
Attesting Officer

C. MARSHALL DANN
Commissioner of Patents